United States Patent
Sato et al.

(10) Patent No.: US 11,120,942 B2
(45) Date of Patent: Sep. 14, 2021

(54) PROCESS FOR PRODUCTION OF MULTILAYER ELECTRONIC COMPONENT

(71) Applicant: TDK CORPORATION, Tokyo (JP)

(72) Inventors: Jun Sato, Tokyo (JP); Yukari Wada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 57 days.

(21) Appl. No.: 16/303,789

(22) PCT Filed: Jul. 11, 2017

(86) PCT No.: PCT/JP2017/025270
§ 371 (c)(1),
(2) Date: Nov. 21, 2018

(87) PCT Pub. No.: WO2018/016386
PCT Pub. Date: Jan. 25, 2018

(65) Prior Publication Data
US 2019/0221367 A1  Jul. 18, 2019

(30) Foreign Application Priority Data

Jul. 21, 2016 (JP) .............................. JP2016-143618

(51) Int. Cl.
*B05D 1/00* (2006.01)
*H01G 4/12* (2006.01)
(Continued)

(52) U.S. Cl.
CPC ............. *H01G 4/1272* (2013.01); *H01G 4/12* (2013.01); *H01G 4/1218* (2013.01); *H01G 4/30* (2013.01); *H01G 13/00* (2013.01); *H01G 13/006* (2013.01)

(58) Field of Classification Search
None
See application file for complete search history.

(56) References Cited

U.S. PATENT DOCUMENTS 5,935,331 A * 8/1999 Naka ..................... B05B 5/0255
118/319
6,401,001 B1 * 6/2002 Jang ..................... H01L 21/288
700/118
(Continued)

FOREIGN PATENT DOCUMENTS

CN    1127696 A     7/1996
JP    H09-232174 A  9/1997
(Continued)

OTHER PUBLICATIONS

Oct. 10, 2017 International Search Report issued in International Patent Application No. PCT/JP2017/025270.
(Continued)

*Primary Examiner* — Gordon Baldwin
*Assistant Examiner* — Mohammad Mayy
(74) *Attorney, Agent, or Firm* — Oliff PLC

(57) ABSTRACT

A process for production of a multilayer electronic component having an element body wherein a functional part and a conductor part are laminated, using an ejection device wherein ink is electrically charged at an ejection part by applying a voltage and the electrically charged ink is ejected from the ejection part by an electrostatic attraction force, and including a first step of forming a green functional part by using a first ink including a functional particle as the ink, a second step of forming a green conductor part by using a second ink including a conductive particle as the ink, a step of forming a green multilayer body by repeating the first step and the second step, and a step of treating the green multilayer body to obtain the element body.

6 Claims, 10 Drawing Sheets

(51) Int. Cl.
*H01G 4/30* (2006.01)
*H01G 13/00* (2013.01)

(56) References Cited

U.S. PATENT DOCUMENTS

| | | | | |
|---|---|---|---|---|
| 2006/0163744 | A1* | 7/2006 | Vanheusden | H01L 23/5328 257/773 |
| 2009/0197008 | A1* | 8/2009 | Kawakami | B05B 5/0255 427/475 |
| 2015/0070818 | A1 | 3/2015 | Tsuru et al. | |
| 2015/0158043 | A1* | 6/2015 | Hart | B05B 5/0255 427/8 |
| 2015/0332853 | A1* | 11/2015 | Kageyama | H01G 4/12 427/79 |

FOREIGN PATENT DOCUMENTS

| | | | |
|---|---|---|---|
| JP | 2002-170750 A | | 6/2002 |
| JP | 2005-067046 A | | 3/2005 |
| WO | 2013/172213 A1 | | 11/2013 |

OTHER PUBLICATIONS

Jan. 22, 2019 International Preliminary Report on Patentability issued in International Patent Application No. PCT/JP2017/025270.

* cited by examiner

PROCESS FOR PRODUCTION OF MULTILAYER ELECTRONIC COMPONENT

TECHNICAL FIELD

The present invention relates to a process for production of multilayer electronic components.

BACKGROUND

Many and various electronic components are mounted on electronic apparatus for information processing, signal conversion, etc., or for power supply circuits. As such electronic components, a multilayer electronic component having a structure in which a functional layer exhibiting the performance of the electronic component and an electrode layer electrically connected to terminals are laminated is known.

Conventionally, as a process for producing the multilayer electronic component, there is exemplified a process of using a process called roll-to-roll, in which a predetermined pattern is formed on a plastic film using a printing technique to obtain an element.

Specifically, a sheet is formed on a plastic film by using slurry which contains materials forming the functional layer, and an electrode is printed on the sheet using a paste which contains conductive materials forming the electrode layer. Subsequently, the sheet on which the electrode is formed is laminated to obtain a green compact, in which the sheets and the electrodes are laminated. Then, the obtained green compact is cut as required, separated, and then they are subjected to heat treatment, whereby the multilayer electronic component is produced.

However, with the above-described process, the position misalignment of the electrodes is liable to occur at the time of lamination and cutting. This is a factor of lowering the formation accuracy of the multilayer structure of the functional layer and the electrode layer in the obtained multilayer electronic component.

As a process for improving the formation accuracy, for example, Patent Document 1 discloses the process for production of the multilayer electronic component by forming the ceramic layer and the electrode layer by jetting droplets of ceramic slurry and the functional material paste containing the conductive material with a use of the ink jet method. According to this method, it is described that the position misalignment can be suppressed, and the lamination step and the cutting step can become unnecessary.

In addition, Patent Document 2 describes the ink suitable for production of the multilayer electronic component by jetting droplets with a use of the ink jet method.

Patent Document 1: JP 09-232174 A
Patent Document 2: WO 2013/172213

SUMMARY

The present invention has been made in view of such circumstances, and the object is to provide a process for production of the multilayer electronic component having extremely good formation accuracy of a multilayer body formed by laminating a functional part and a conductor part.

In recent years, high performance, miniaturization, etc. of the electronic component are demanded due to the requirement of higher performance, miniaturization, etc. of the electronic apparatus. When the electronic components are miniaturized, the ratio (yield) at which the produced electronic components satisfy a predetermined standard (property) sharply decreases. This is because as the size of the electronic component is reduced, the formation accuracy of the multilayer body deteriorates, which greatly affects the characteristics (properties) of the electronic component. This causes a decrease in a number of the electronic components having properties within the predetermined maximum tolerance. Therefore, the present inventors conducted various studies to further enhance the formation accuracy of the multilayer body.

As a result, it was found that there is a limit to improve formation accuracy by the conventional roll-to-roll process. Particularly, the properties (for example, electrostatic capacitance of a multilayer ceramic capacitor, electric resistance of NTC thermistor, etc.) of a multilayer electronic component having small size was difficult to comply with a predetermined standard, and as a result, the yield was lowered. Further, although the details are not described in Patent Document 1, the impact accuracy was only about 10 µm even when droplets were ejected by a normal ink jet method. Therefore, a remarkable improvement in the formation accuracy as compared with the conventional roll to roll process cannot be expected, which was not enough.

An embodiment of the invention is:

[1] a process for production of a multilayer electronic component having an element body in which a functional part and a conductor part are laminated, using an ejection device, wherein ink is electrically charged at an ejection part by applying a voltage and the electrically charged ink is ejected from the ejection part by an electrostatic attraction force, and including a first step of forming a green functional part by using a first ink including functional particles as the ink, a second step of forming a green conductor part by using a second ink including conductive particles as the ink, a step of forming a green multilayer body by repeating the first step and the second step, and a step of treating the green multilayer body to obtain the element body.

In the above production process, the green functional part and the green conductor part are directly printed by using the ejection device utilizing electrostatic attraction force, and the green multilayer body is obtained by repeating these overprinting. By using the ejection device utilizing the electrostatic attraction force, even if the distance between the nozzle and the workpiece is 100 µm or less, it is possible to stably eject and therefore printing can be performed with high accuracy. According to such green multilayer body, it is possible to obtain a multilayer electronic component having extremely high formation accuracy.

[2] The process for production of the multilayer electronic component according to the above [1], in which the green multilayer body is a green chip in which a shape and a size of the green chip correspond to those of the element body.

In the above production process, since the green chip is formed as a separated green multilayer body from the beginning, it is possible to omit a step of cutting the green multilayer body into a plurality of separated green chips. As a result, it is possible to suppress variations in properties, electric resistance, etc. of the multilayer electronic component.

[3] The process for production of the multilayer electronic component according to the above [1] or [2], in which the green conductor part is rectangular shaped and the width in a short direction is 180 µm or less.

Since the production process described above can increase the formation accuracy of the internal structure of the multilayer electronic component, it is suitable as a production process of a multilayer electronic component having extremely small size.

[4] The process for production of the multilayer electronic component according to any one of [1] to [3], in which
the ink includes a solvent and a resin, and
a viscosity of a solution including the solvent and the resin is 30 mPa·s or more.

By setting the viscosity of the solution within the above range, it is possible to ensure the uniformity of the line width of line segments formed by ejected ink and the uniformity of the thickness of the printed region.

[5] The process for production of the multilayer electronic component according to any one of [1] to [4], in which
the same voltage is simultaneously applied to a plurality of nozzles in the ejection device.

Since the ejection device has the above-described structure, a plurality of green multilayer bodies can be simultaneously formed.

DETAILED DESCRIPTION

Figure 1:
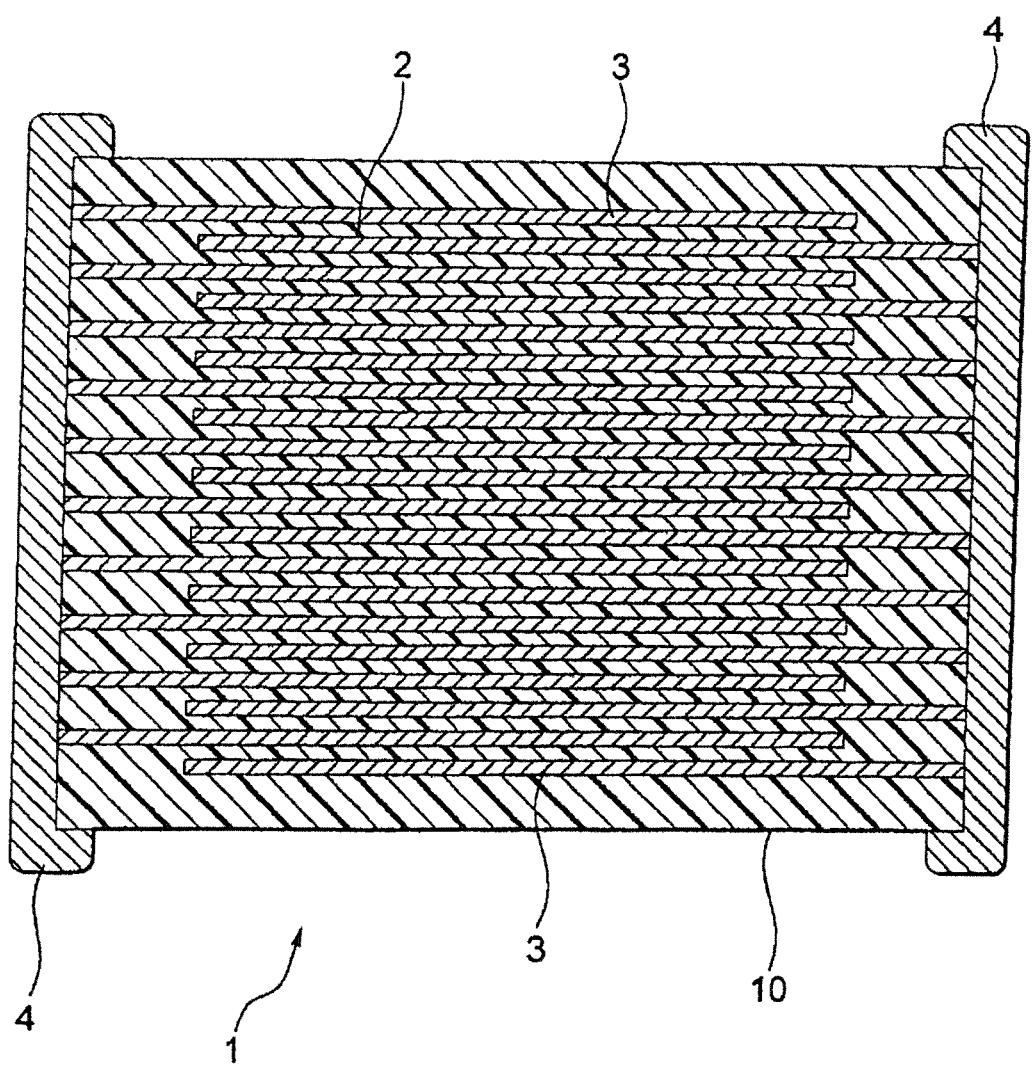
FIG. 1 is a schematic cross-sectional view of a multilayer ceramic capacitor as an example of the multilayer electronic component produced by the production process according to the present embodiment.

Hereinafter, the invention will be described in detail with reference to the present embodiments shown in the drawings in the following order.

Figure 2:
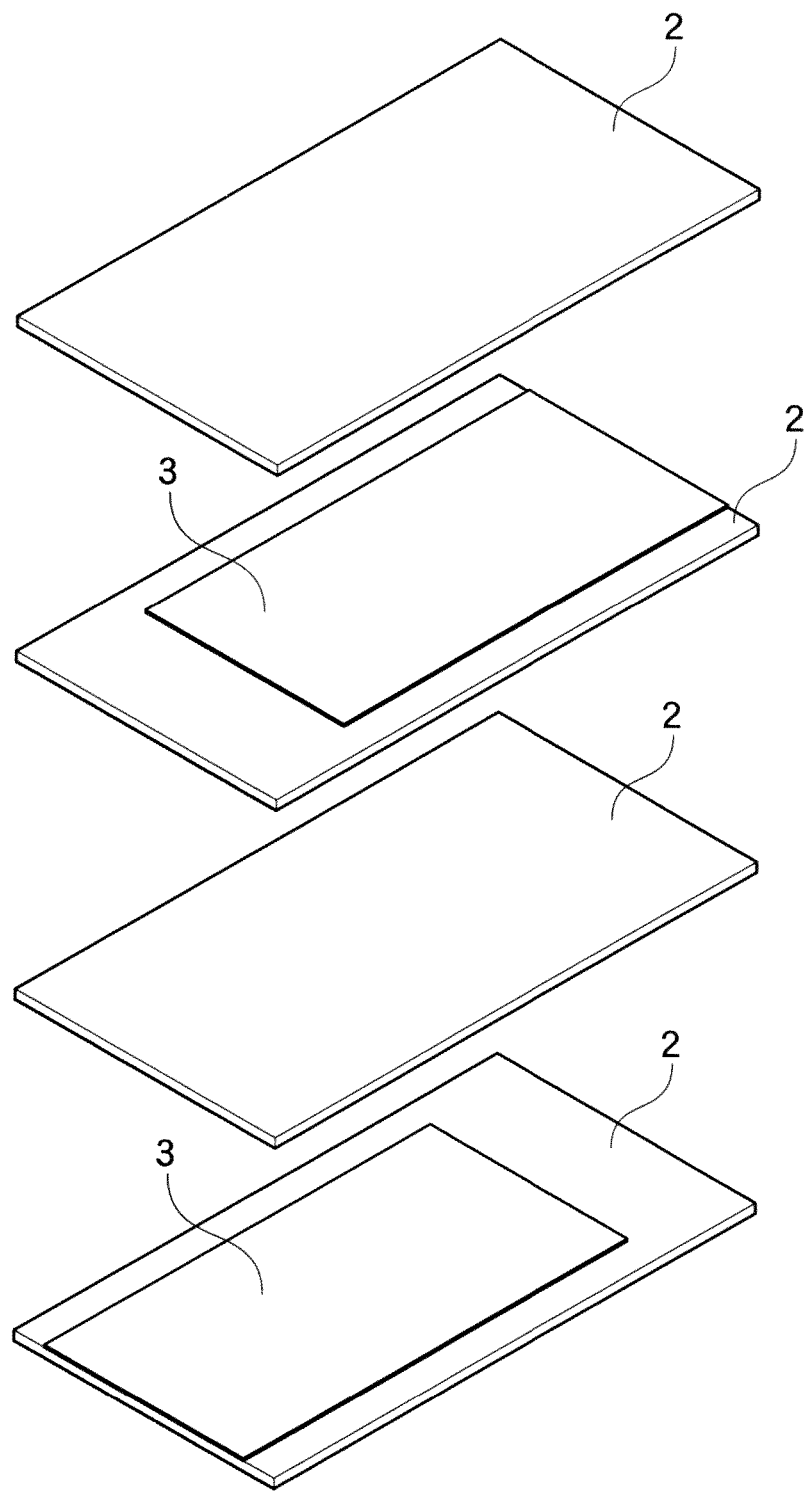
FIG. 2 is an exploded perspective view showing a laminated structure of the element body included in the multilayer ceramic capacitor as an example of the multilayer electronic component produced by the production process according to the present embodiment.

1. Multilayer electronic component
2. Process for production of multilayer electronic component
   2.1. Ejection device
   2.2. Ink
      2.2.1. The first ink
      2.2.2. The second ink
      2.2.3. Viscosity of resin solution
   2.3. Production step
      2.3.1. The first step
      2.3.2. The second step
      2.3.3. Step of obtaining green multilayer body
      2.3.4. Step of obtaining element body
3. Effect of the present embodiment
4. Modified example 1. Multilayer Electronic Component FIG. 1 shows a multilayer ceramic capacitor as an example of the multilayer electronic component produced by the production process according to the present embodiment. The multilayer ceramic capacitor 1 has the element body 10, and as shown in FIGS. 1 and 2, the element body 10 is configured by alternately laminating the rectangular functional part (ceramic layer 2) and the rectangular conductor part (internal electrode layer 3) which is formed smaller than the functional part either in the short direction or the longitudinal direction. At both end parts of the element body 10, there are formed a pair of terminal electrodes 4 electrically connected to the internal electrode layers 3 alternately arranged inside the element body 10.

By applying a voltage to the terminal electrode, the ceramic layer disposed between the electrode layers exhibiting different polarities exerts a predetermined dielectric property. As a result, it functions as a capacitor.

The shape and the size of the multilayer electronic component may be appropriately determined according to the purposes and the applications. The present embodiment describes that the shape of the multilayer ceramic capacitor is a rectangular parallelepiped shape. The size is preferably small. In the case of the multilayer ceramic capacitor, the size is, for example, not more than the longitudinal of 0.4 mm or less× the width of 0.2 mm or less× the thickness of 0.1 to 0.2 mm or less.

2. Process for Production of Multilayer Electronic Component

Subsequently, an example of a process for production according to the present embodiment will be described in detail below. In the production process according to the present embodiment, the green functional part to be the functional part and the green conductor part to be the conductor part are formed by printing with a use of the ejection device utilizing electrostatic attraction force. First, the ejection device used in the production process according to the present embodiment will be described.

(2.1. Ejection Device)

Figure 3:
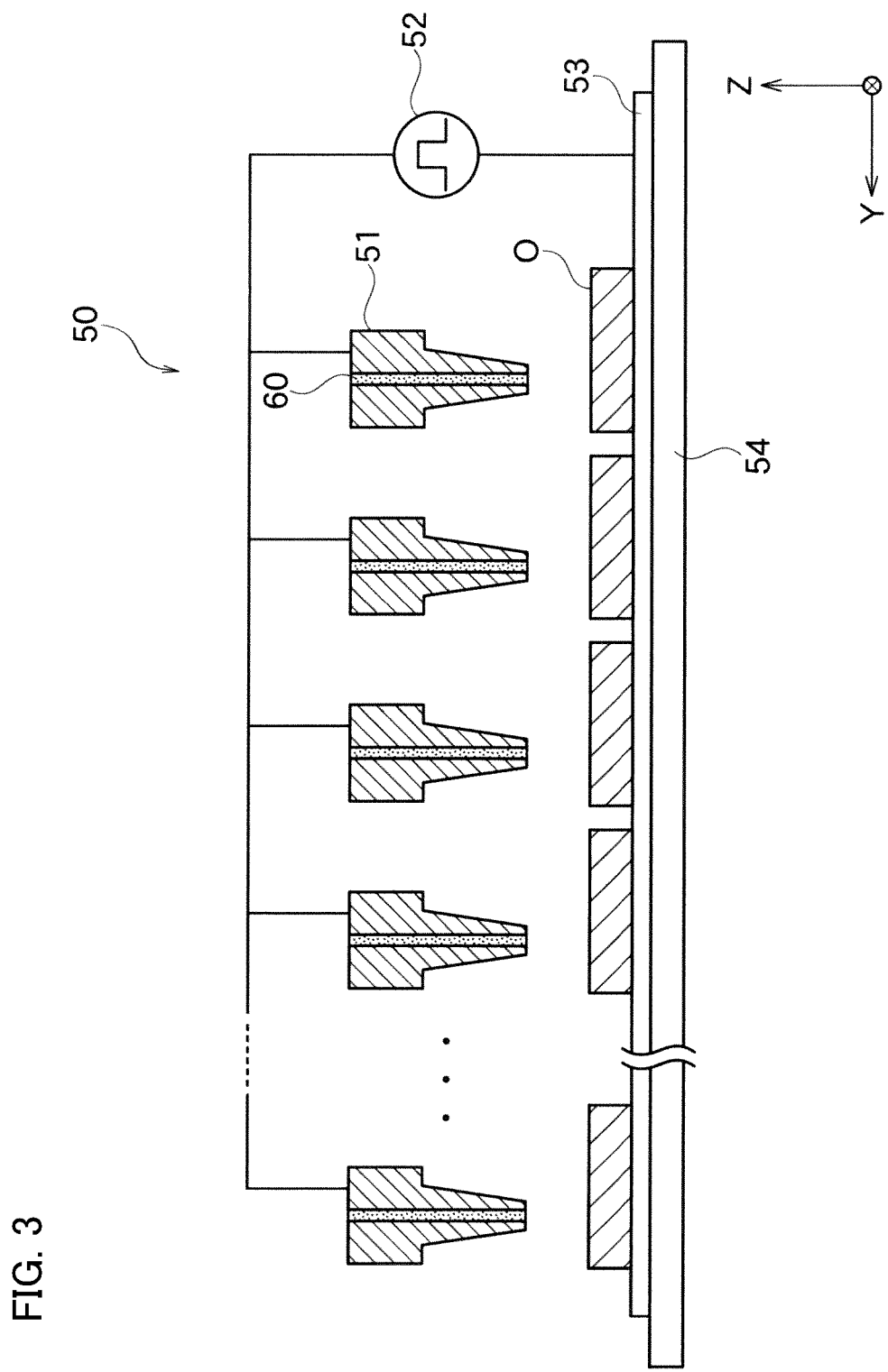
FIG. 3 is a schematic cross-sectional view of a main part of the ejection device used in the production process according to the present embodiment.

In the present embodiment, as shown in FIG. 3, the ejection device 50 includes a plurality of nozzles 51 as ejection parts and the voltage applying means 52. Although not clearly shown in FIG. 3, the ejection device at least includes a first head section having a plurality of nozzles to which the first ink is supplied and a second head section having a plurality of nozzles to which the second ink is supplied.

The voltage applying means 52 is connected to the nozzle 51 and the support 53, and voltage can be applied between the nozzle 51 and the support 53. As a result, the ink 60 supplied into the nozzle from the ink supply unit (not shown) can be electrically charged. Note that the applied voltage is a high voltage of several hundred volts to several thousand volts, and the same voltage can be applied to a plurality of nozzles electrically connected in parallel.

In addition, the support 53 is held on a table 54 that is movable in each direction of X axis, Y axis, and Z axis according to an electric signal from a control unit (not shown). Thus, the support 53 is also movable in correspondence with the movement of the table 54. If the nozzle and an object to be drawn can relatively move to each other, the nozzle or the table may move.

In the ejection device 50, when the control unit (not shown) sends an electric signal to the voltage applying means 52, the voltage applying means 52 applies voltage corresponding to the electric signal to the nozzle 51. By performing such control, the electrically charged ink 60 is drawn from the nozzle 51 by the electrostatic attraction force and ejected to the object O to be drawn (the support or the green functional part or the green conductor part formed on the support). At this time, the control unit can send the electrical signal also to the table 54, and the table 54 can be moved on the XY plane while keeping the distance between the nozzle 51 and the table 54 constant. Therefore, since the table moves on the XY plane with the ink 60 ejected to the object O to be drawn, a pattern is drawn on the object O to be drawn.

When the control unit stops transmitting the electric signal, the voltage applying means 52 sets the voltage applied to the nozzle 51 to zero. As a result, since the electrostatic attraction force does not act on the ink 60, the ink 60 is separated from the object O to be drawn and then pulled back to the nozzle 51 due to the surface tension effect. By this series of operations, it is possible to form a predetermined pattern on the object to be drawn.

According to the ejection device, the ink is electrically charged, and the ejection start and the ejection stop of the electrically charged ink are controlled by the electrostatic attraction force. Thus, the ejection start and the ejection stop of the ink are respond extremely fast and accurately to the voltage application. Therefore, the ink is ejected immediately to the object to be drawn when the voltage is applied, and the ejection of the ink stops immediately without causing dripping or the like when the voltage application is stopped. Thus, a predetermined pattern can be drawn repeatedly with high reproducibility.

According to the present embodiment, the voltage is applied to the plurality of nozzles included in the ejection device so as to form the same pattern at the same time. That is, the application patterns of the voltage applied to the plurality of nozzles are the same. Therefore, only one power source is enough for applying voltage to the plurality of nozzles mounted on one head. And the voltage applying means does not need to be configured to form different patterns at the same time by simultaneously applying different voltages to the plurality of nozzles. In addition, since the same voltage is applied to the plurality of nozzles forming the same pattern, an insulation processing between adjacent nozzles is unnecessary. As a result, the formation of the ejection device can be simplified according to the present embodiment.

(2.2. Ink)

According to the present embodiment, as the ink used in the above-described ejection device, the first ink for forming the green functional part to be the functional part and the second ink for forming the green conductor part to be the conductor part are prepared. Hereinafter, the first ink and the second ink will be described.

(2.2.1. The First Ink)

According to the present embodiment, the first ink includes functional particles, a solvent, and a resin. The method of preparing the first ink is not particularly limited, but for example, a resin solution may be prepared by dissolving the resin in the solvent, and the resin solution and the functional particles may be mixed. In the first ink, the functional particles are dispersed in the resin solution.

The functional particles are not particularly limited as long as they are particles of a material forming the functional part or a compound to be the material, etc., and they are appropriately selected depending on such as the purpose of use. For example, when the material forming the functional part is ceramic, the particles of the ceramic or the particles of carbonate, nitrate, hydroxide, organometallic compound, etc. to be the ceramic by heat treatment or the like are exemplified. Further, for example, when the material of the functional part is a metal or an alloy, particles of the metal or the alloy are exemplified.

The particle diameter of the functional particle may be determined in consideration of the heat treatment property (such as sinterability) of the functional particles and the sedimentation of the functional particles dispersed in the first ink. When the particle diameter is increased, sedimentation of the functional particles tends to occur in the first ink, and the ejection amount of the ink at the time of drawing tends to vary. Thus, uniformity of the line width of the drawn line segment, the thickness of the formed pattern, etc. tends to be unable to maintain. In addition, when the particle diameter is reduced, sintering of the functional particles tends to be too fast during the heat treatment of the green multilayer body, and structural defects (cracking, delamination, etc.) caused by simultaneous firing of the functional part and the conductor part may occur, which is not preferable. In the present embodiment, from the viewpoint of the heat treatment property of the functional particles, the average particle diameter of the functional particles is preferably about 100 to 500 nm. If there is no restriction on the heat treatment, the average particle diameter may be on the order of several tens of nm in consideration of the influence of sedimentation of the functional particles.

The resin contained in the first ink is not particularly limited, and examples thereof include resins such as cellulose resin, butyral resin, acrylic resin, polyvinyl alcohol, epoxy resin, phenol resin, styrene resin, urethane resin, etc. The solvent contained in the first ink is also not particularly limited, and water or an organic solvent is exemplified. Specific organic solvent includes aliphatic hydrocarbons such as decane, tetradecane and octadecane, ketones such as methyl ethyl ketone and cyclohexanone, aromatic hydrocarbons such as xylene and toluene, ethers such as methyl cellosolve, butyl cellosolve, methyl carbitol, butyl carbitol and triethylene glycol monoethyl ether, esters such as ethyl acetate and butyl carbitol acetate, alcohols such as propanol, ethylene glycol and terpineol, and polar solvents such as dimethylsulfoxide, N-methylpyrrolidone, dimethylacetamide. These are used alone or in combination of two or more.

The first ink may contain dispersants, plasticizers, dielectrics, glass frit, insulators, antistatic agents, etc. when necessary.

(2.2.2. The Second Ink)

According to the present embodiment, the second ink contains conductive particles, a solvent, and a resin. The process for preparing the second ink is not particularly limited, but it may be the same as the process for preparing the first ink.

The conductive particles are not particularly limited as long as they are the particles of a material forming the conductive part or the compound to be the material, and are appropriately selected according to compatibility with the material constituting the functional part, applications, etc.

The particle diameter of the conductive particles is determined in consideration of the heat treatment properties (sinterability etc.) of the conductive particles and the sedimentation of the conductive particles in the second ink, similarly to the particle diameter of the functional particles. In the present embodiment, the average particle diameter of the conductive particles is preferably about 100 to 500 nm from the viewpoint of heat treatment properties of the conductive particles. If there is no restriction on the heat treatment, the average particle diameter may be several tens of nm in consideration of the influence of the sedimentation of functional particles.

2.2.3. Viscosity of Resin Solution

In the present embodiment, it is preferable to determine the viscosity of the resin solution not containing particles (the functional particles and the conductor particles) in the ink, in consideration of the sedimentation of particles (the functional particles and the conductor particles) and the line width of the line segment to be drawn. As described above, when sedimentation of particles occurs in the ink, the ejection amount of the ink tends to vary at the time of drawing, there is a tendency that the uniformity of the line width of the drawn line segment, uniformity of the thickness of the formed pattern, etc. cannot be maintained.

Considering that the Stokes' law can be applied when Reynolds number ($Re = \rho w \cdot v \cdot a / \mu$) expressed by the ratio of the inertial force to the viscous force is less than two, the Stokes' law is applied to the sedimentation rate of the particles. According to the Stokes' law, the equilibrium sedimentation rate v is expressed by $v = (\rho_s - \rho_w) g \cdot a^2 / 18\mu$ by the solution viscosity $\mu$, particle diameter a, solution density $\rho_w$ and particle density $\rho_s$. As can be seen from this equation, the equilibrium rate during sedimentation is inversely proportional to the viscosity of the solution. Therefore, to suppress unevenness of the particle density in the ink due to the sedimentation of the particles contained in the ink, it is effective to increase the viscosity of the solution not containing particles in the ink, that is, the resin solution, and not to increase the viscosity of the ink containing the particles.

According to the present embodiment, from the viewpoint of the uniformity of the line width of the drawn line segment, the thickness of the formed pattern, etc., the viscosity of the resin solution not containing particles (the functional particles and the conductor particles) in the ink is preferably 30 mPa·s or more.

The present inventors examined the following. The relationship between the resin concentration in the resin solution and the viscosity of the resin solution and the relationship between the resin concentration in the ink and the viscosity of the ink are compared. It turned out that, in either case, although the resin concentration and common logarithms of the viscosity are in a proportional relationship, the viscosity of the ink tends to vary depending on the concentration of the particles, the particle diameter, etc. This means that the viscosity of the resin solution is preferable to be specified rather than the viscosity of the ink, when specifying the viscosity for suppressing the sedimentation of the particles.

On the other hand, when the particle diameter to be used can be reduced to several tens of nm, sedimentation is suppressed even if the viscosity of the resin solution is low. Thus, when the viscosity of the resin solution is low, the line width can be made small, which is advantageous in the case of producing electronic components having extremely small size.

The upper limit of the viscosity of the resin solution is not particularly limited if it can be ejected as ink and there is no problem in responsiveness, and is preferably, for example, 1200 mPa·s or less.

(2.3. Production Step)

According to the production step of the present embodiment, by using the above-described ejection device, the green functional part is formed by printing the first ink on the support or the green conductor part (the first step), and a green conductor part is formed by printing the second ink on the green functional part (the second step). Then, this process is repeated so as to obtain the green multilayer body in which the green functional part and the green conductor part are alternately laminated, and then the green multilayer body is treated to obtain the element body. Each step will be described below.

(2.3.1. The First Step)

Figure 4A:
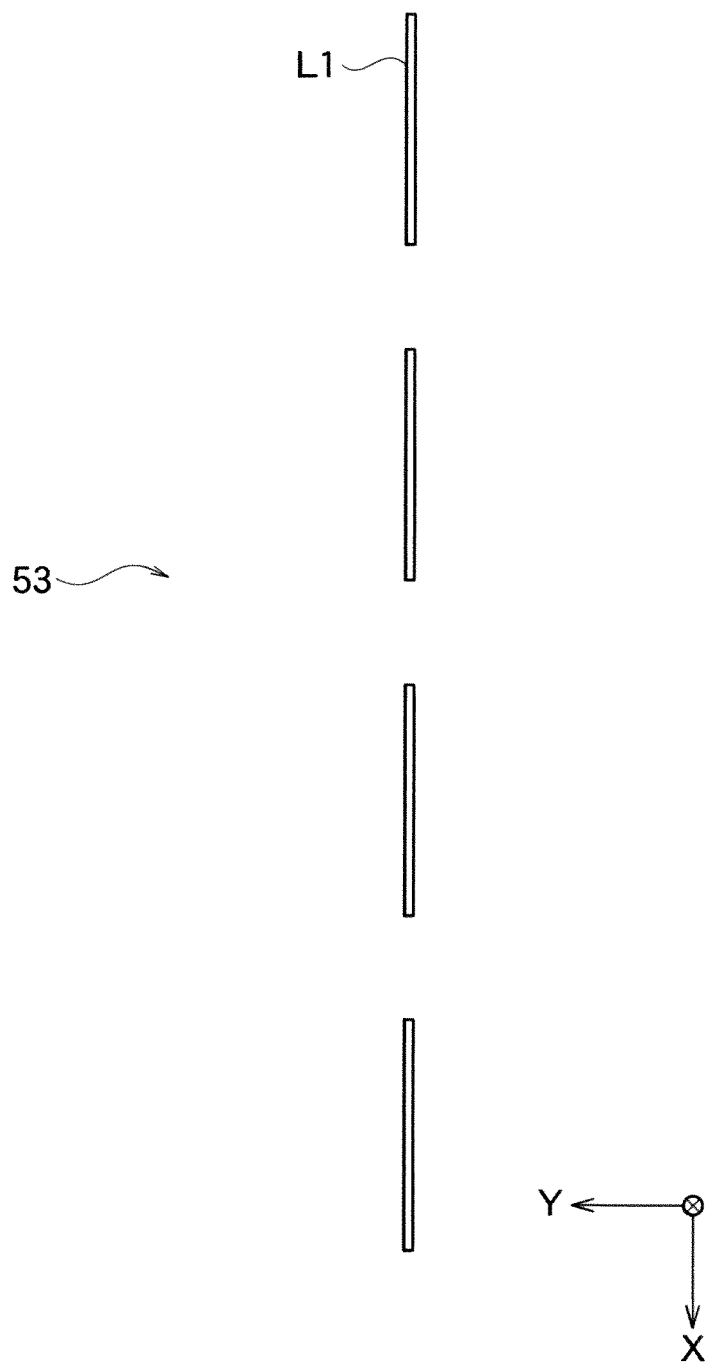
FIG. 4A is a plan for describing the first step in the production process according to the present embodiment.

According to the present embodiment, the green functional part is formed on the support. In this step, as shown in FIG. 3, in the ejection device, by controlling the voltage applied to the plurality of nozzles to which the first ink is supplied, the electrostatic attraction force is acted on the first ink, thus the first ink is ejected and printed onto the support. As shown in FIG. 4A, when the application of voltage is stopped at predetermined time intervals while the table (not shown) moves in the X axis direction by a predetermined amount, while the voltage application is stopped, the extracted first ink is separated from the support and returns to the nozzle (not shown), whereby the ink ejection intermittently stops. As a result, a plurality of line segments L1 having a predetermined length parallel to the X axis direction are formed on the support 53.

Figure 4B:
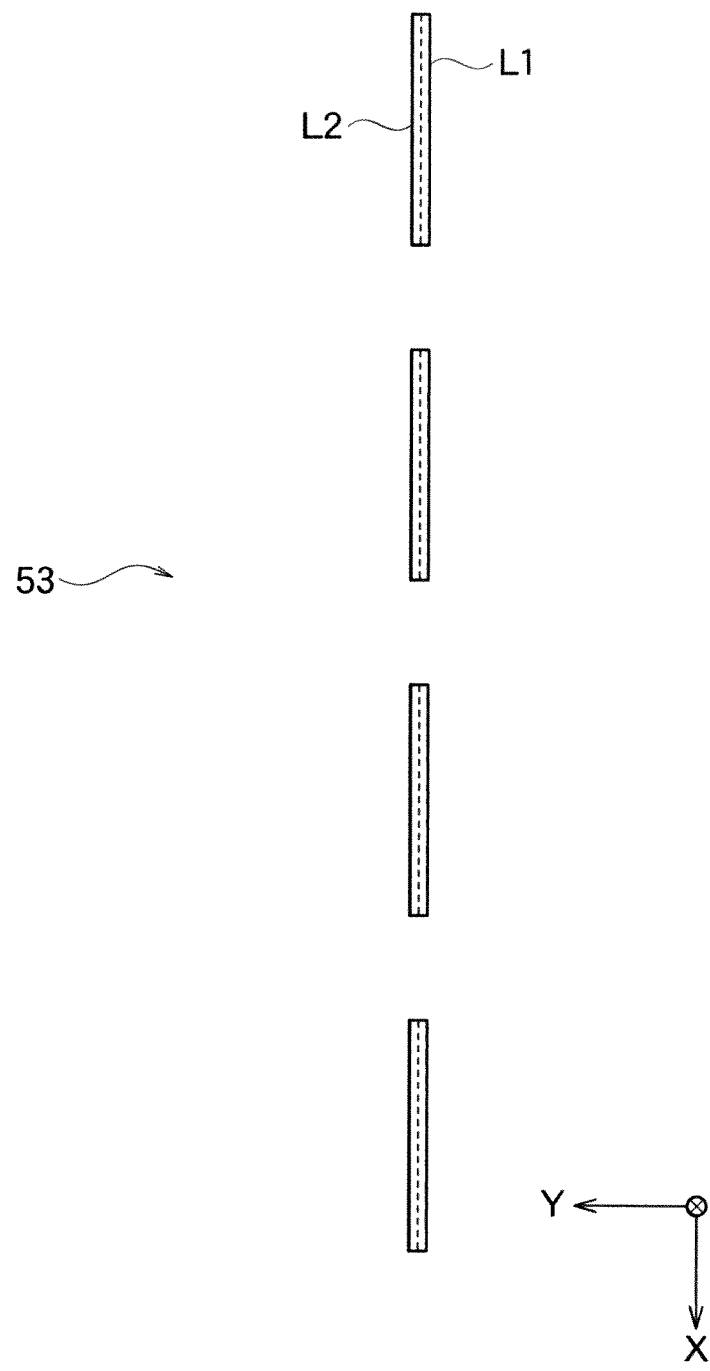
FIG. 4B is a view subsequent to FIG. 4A.
Figure 4C:
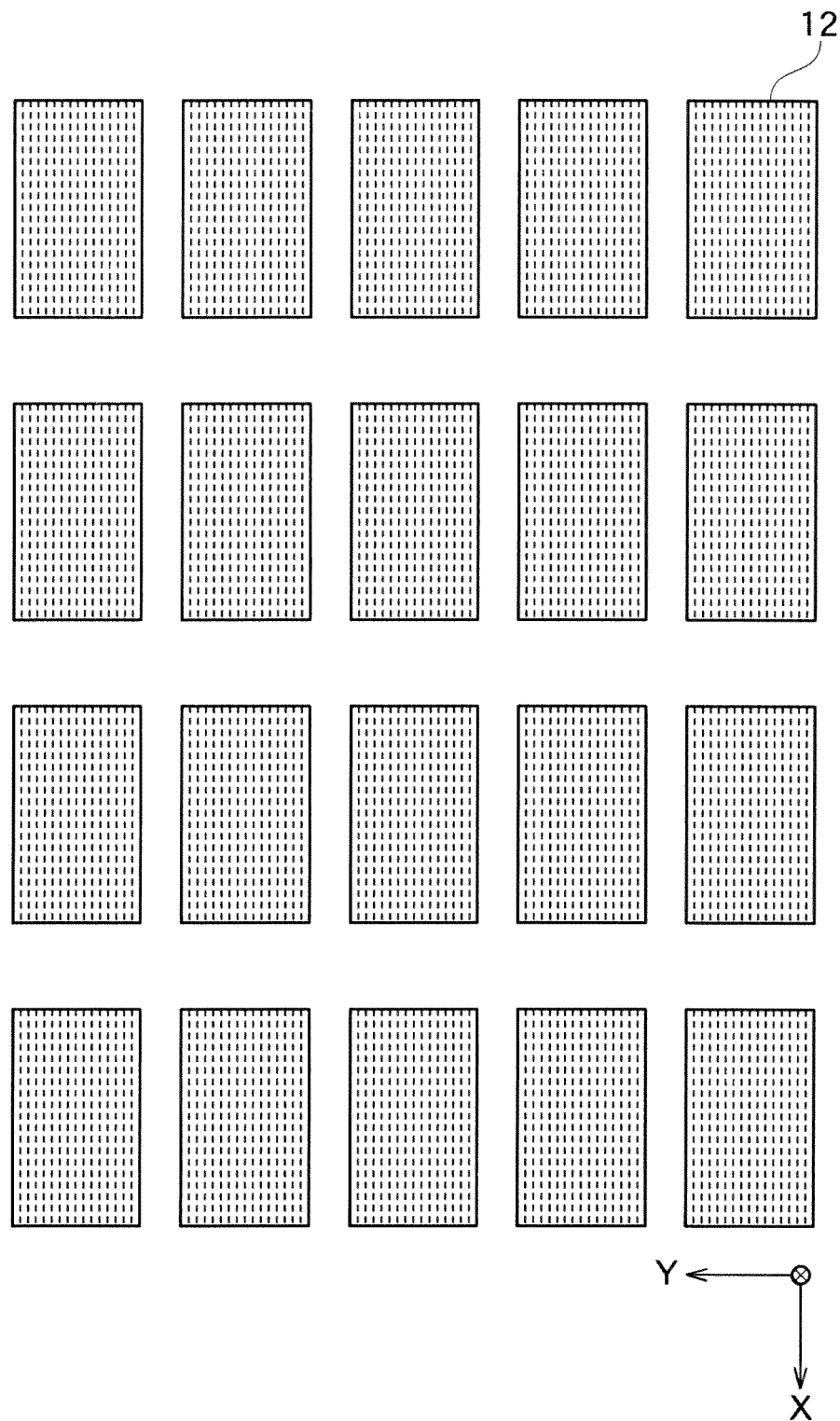
FIG. 4C is a view subsequent to FIG. 4B.

Subsequently, after the table (not shown) moves by a predetermined amount in the Y axis direction, the table moves again in the X axis direction. A voltage is intermittently applied between the nozzle (not shown) and the support in the same manner as in the formation of the line segment L1, and as shown in FIG. 4B, the line segment L2 parallel to and in contact with the formed line segment L1 is newly formed. By repeating these operations for a predetermined number of times, as shown in FIG. 4C, a plurality of regions, in which a predetermined number of line segments having a predetermined length is arranged, is formed, i.e. a plurality of rectangular regions (green functional part 12) is formed. A rectangular shaped green functional part 12 having a desired thickness can be formed by repeatedly forming line segments so as to be arranged, directly on the formed rectangular region, as necessary.

(2.3.2. The Second Step)

In the second step, the table moves by a predetermined amount in the Y-axis direction so that the nozzle filled with the second ink is positioned above the green functional part formed in the first step. Alternatively, the table may be fixed and the nozzle may move such that the nozzle filled with the second ink is positioned above the green functional part formed in the first step.

Figure 5A:
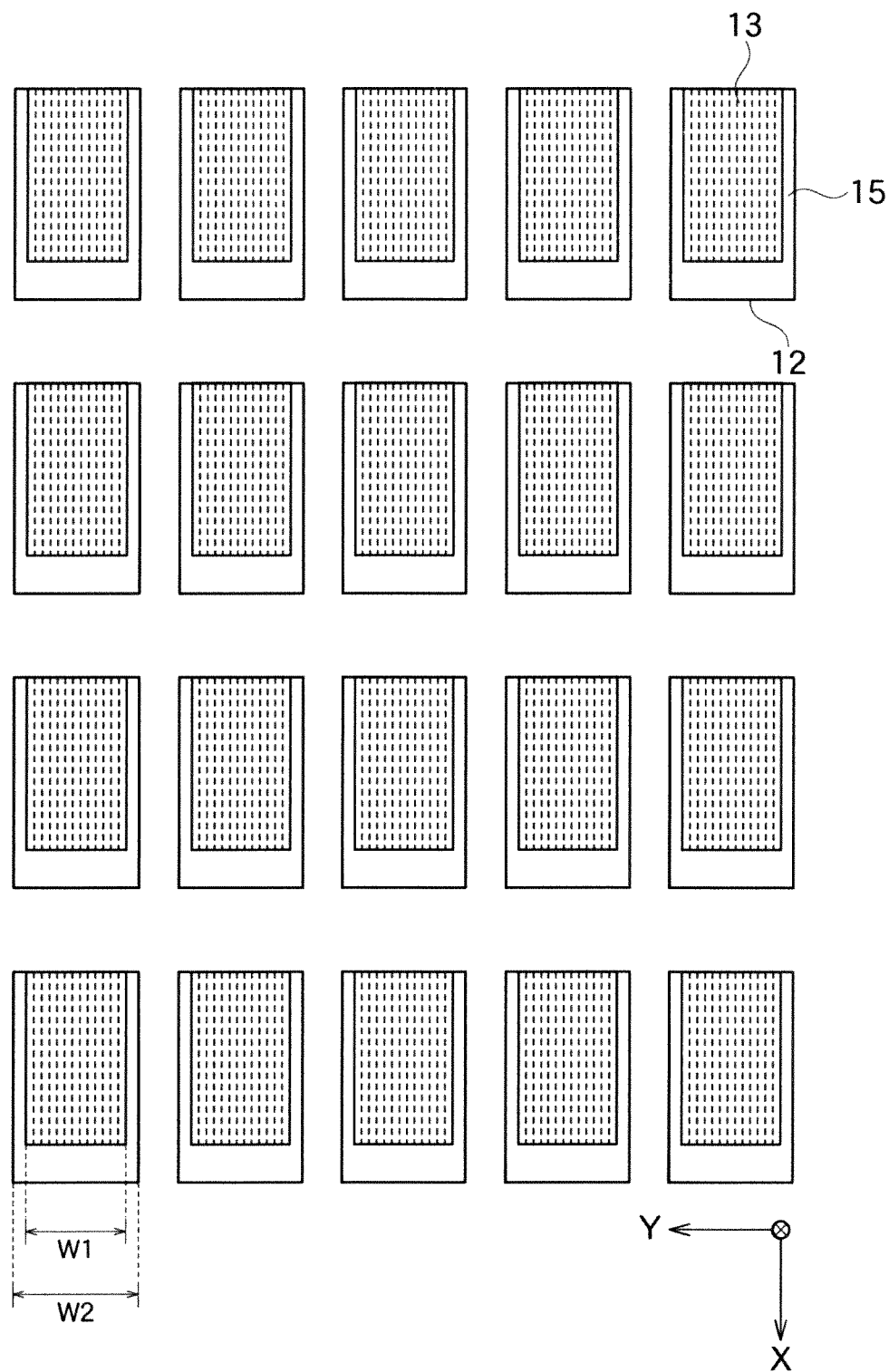
FIG. 5A is a plan for describing the second step in the production process according to the present embodiment.
Figure 5B:
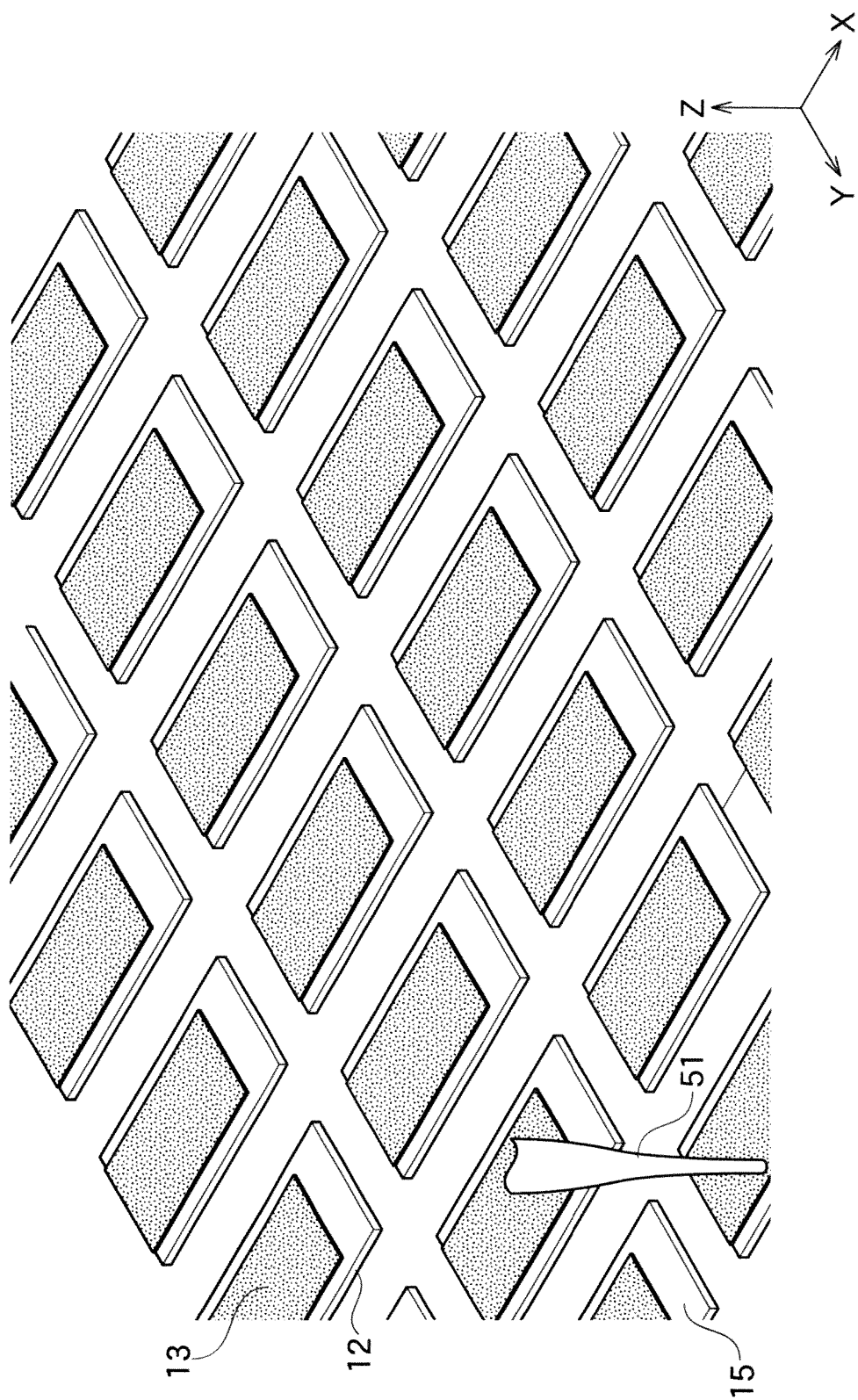
FIG. 5B is a perspective view for describing the second step in the production process according to the present embodiment.

After the green functional part formed in the first step is dried, as shown in FIGS. 5A and 5B, similar to the first step, the second ink is used to form a line segment of a predetermined length on the green functional part, and by repeating this, a region in which a predetermined number of line segments having a predetermined length are formed so as to be arranged is formed, for example, a rectangular region (the green conductor part 13) is formed. The nozzles are not illustrated in FIG. 5A. In addition, only the tip part of the nozzle is illustrated in FIG. 5B.

According to the present embodiment, when the length W1 of the rectangular green conductor part in the short direction is 180 μm or less, an effect on a product yield is obtained in comparison with the conventional production process. In particular, the effect of improving the product yield becomes very large when the length W1 is 60 μm or less. According to the method of the present embodiment, since the internal structure of the multilayer electronic component is formed with high formation accuracy, it can be formed accurately even when the length of the green conductor part in the short direction is extremely small. As a result, the yield of small size electronic components can be increased. The length in the short direction of the green conductor part has the most influence on the electrostatic capacitance, thus the length in the short direction of the green conductor part is specified.

Particularly in the case of the multilayer ceramic capacitor, to exhibit a high dielectric property, it is preferable to increase the ratio of the length W1 of the green conductor part in the short direction with respect to the length W2 of the green functional part in the short direction. According to the process of the present embodiment, since the formation accuracy of the green conductor part can be increased, the length of the green conductor part in the short direction can be increased, and thus the obtainable electrostatic capacitance can be maximized.

As shown in FIGS. 5A and 5B, the green conductor part 13 is aligned with respect to the green functional part 12 such that their ends are at the same position, but in the short direction (Y-axis direction) and in the longitudinal direction (X-axis direction), the green conductor part is formed to be smaller than the green functional part. Therefore, after the green conductor part is formed on the green functional part, there exists a region (blank region 15) where nothing is formed on the green functional part.

When the green functional part is thin, the thickness of the green conductor part with respect to that of the green functional part becomes relatively large. Therefore, when the number of laminated layers in the multilayer electronic component increases, a level difference between the green conductor part and the blank region has an influence on the green multilayer body. As a result, structural defects (cracks, delamination, etc.) tend to occur during heat treatment of the green multilayer body, etc. Therefore, before and after forming the green conductor part, the green functional part may be formed on the blank region 15. Thus, the level difference between the green conductor part and the blank region is eliminated, so that the occurrence of the structural defects caused by the level difference can be suppressed.

In addition, the green functional part formed on the blank region may be formed using the first ink or may be formed using the ink different from the first ink.

When the green functional part is thick, there is a tendency that structural defects caused by not forming the green functional part on the blank region tends to be small, and that the green functional part may not be formed on the blank region.

According to the present embodiment, in the first and the second steps, the line width of the line segments formed using the ink are about 5 to 50 μm. In the present embodiment, line segments of the predetermined length are repeatedly formed in parallel and in a row, so that the line segments are brought into contact with each other and are connected to form a plane region having a single thickness.

According to the present embodiment, since the line segment is formed by using the above-described ejection device utilizing the electrostatic attraction force, the misalignment (deviation) between the length of the actually formed line segment and the length of the set line segment, and the misalignment (deviation) between the actually formed position and the set formation position can be made extremely small. Therefore, even for rectangular regions formed by connecting the line segments, the misalignment (deviation) from setting can be made extremely small. In other words, the formation accuracy of the rectangular region can be made extremely high.

The processes of forming the rectangular region may be the following. Line segments may be formed in parallel along the short direction or the longitudinal direction of the rectangular region to be formed, and the rectangular region may be formed. The line segments may be formed in a diagonal direction of the rectangular region and the rectangular region may be formed by varying the length of the line segment to be formed.

According to the present embodiment, an example is described in which the green functional part and the green conductor part determining the outer shape of the element are formed in a rectangular shape. However, according to the electronic component to be produced, the outer shape and the shape of the green conductor part may have a basic shape of a polygon, such as a hexagon or an octagon, or a circle.

(2.3.3. Step of Obtaining Green Multilayer Body)

According to the first and the second steps described above, by repeating the formation of the green conductor part on the green functional part and the formation of the green functional part on the green conductor part, the green multilayer body in which the green functional part and the green conductor part are alternately laminated.

As described above, by forming a plurality of line segments in parallel and connected to each other with a use of the ejection device utilizing electrostatic attraction force, the green functional part and the green conductor part having a desired area are formed. Regarding thicknesses of the green functional part and the green conductor part, unevenness of the thickness within the plane is suppressed by adjusting the line width and the pitch width between the lines. Therefore, the lengths in the short directions of the green functional part and the green conductor part are twice or more the line widths of the line segments.

Further, since the green functional part and the green conductor part are accurately formed and laminated by using the ejection device utilizing the electrostatic attraction force, the formation accuracy of the obtained green multilayer body is very high. Therefore, when viewing the green multilayer body from the laminating direction, it is possible to make the region where each green conductor part overlaps very large.

Figure 6A:
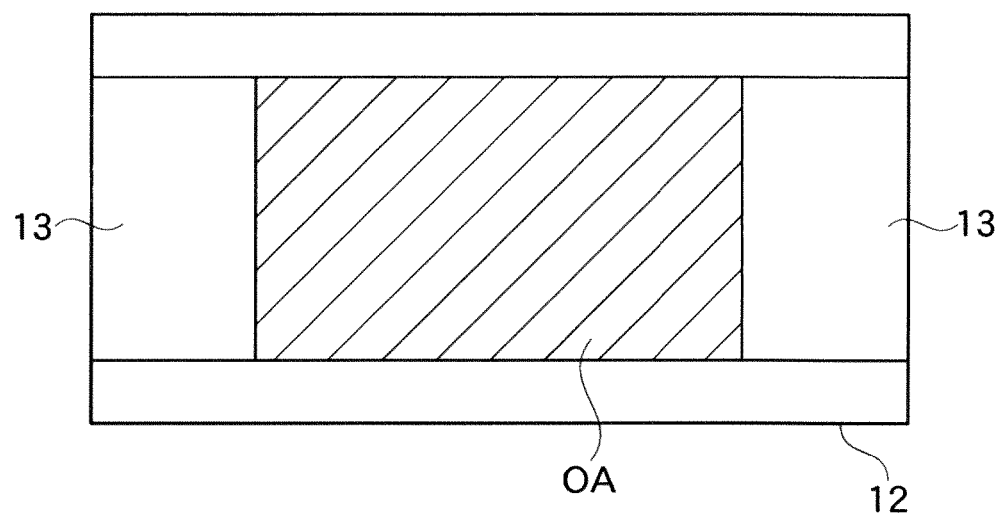
FIG. 6A is a view for describing the overlapping part of the green conductor part.
Figure 6B:
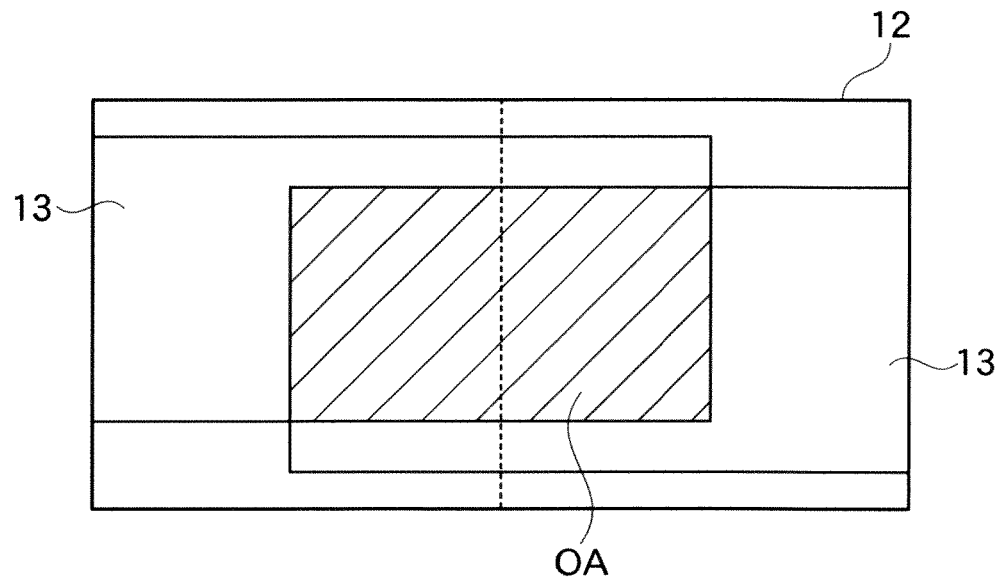
FIG. 6B is a view for describing the overlapping part of the green conductor part.

When a voltage is applied to the multilayer electronic component, only the functional part corresponding to the applied region (the conductor part) exerts its properties. Therefore, the area of the region where the conductor parts overlap becomes a problem. For example, as shown in FIG. 6B, when the formation accuracy of the green conductor part is low, and the green conductor part is out of alignment from the ideal position, the overlapping region OA of the green conductor parts becomes smaller by the misalignment amount, compared to the overlapping region OA of the ideal arrangement of the green conductor parts shown in FIG. 6A. As a result, although properties of the same electronic component are meant to be the same, deviation in properties obtained becomes large, and the number of electronic components that do not satisfy the predetermined standard increases.

Figure 7A:
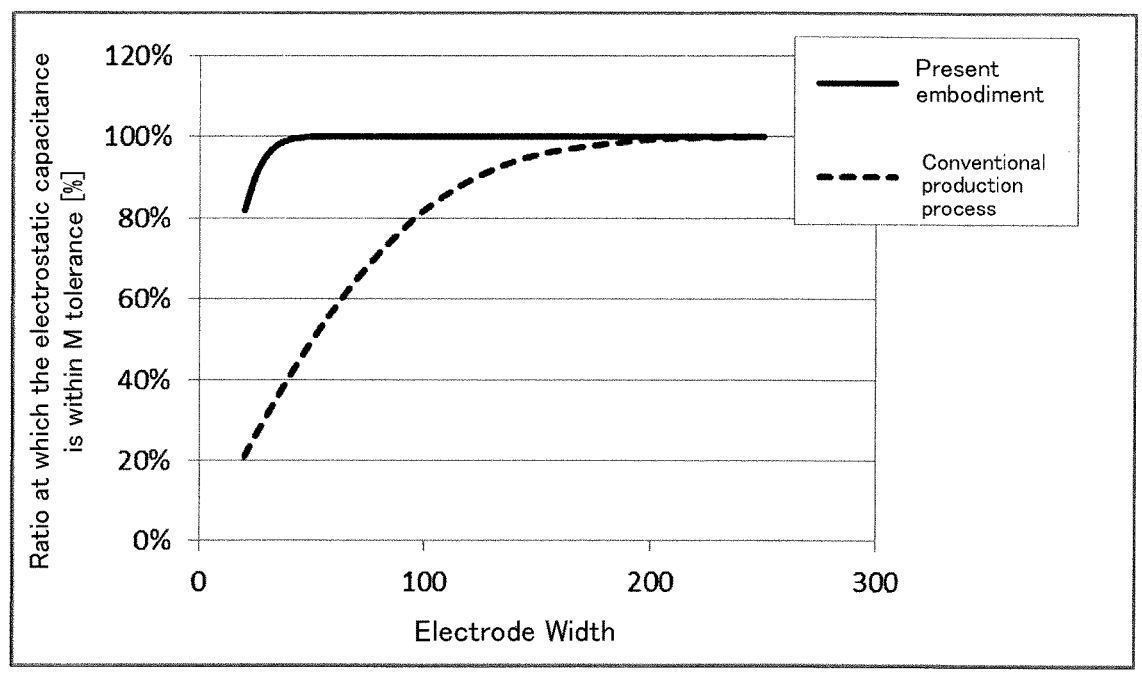
FIG. 7A is a graph showing the relation between the length of the conductor part and the ratio at which the electrostatic capacitance of the functional part sandwiched between the two conductor parts is within M tolerance (±20%), when position deviation of one conductor part opposed to the other conductor part follows a normal distribution.
Figure 7B:
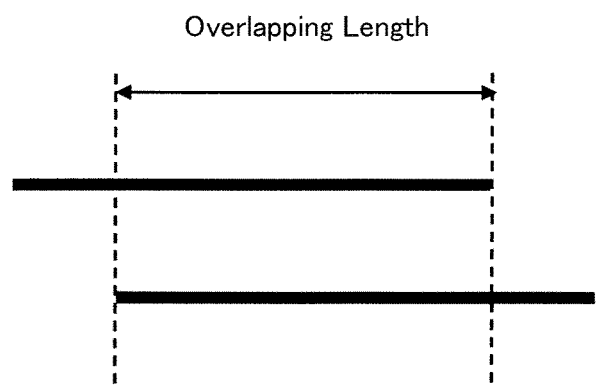
FIG. 7B is a view showing the relationship of the conductor parts in the cross section along the broken line in FIG. 6B.

FIG. 7A is a graph showing the relation between the length of the conductor part (electrode width) and the ratio at which the electrostatic capacitance of the functional part sandwiched between the two conductor parts is within M tolerance (±20%), when positional deviation of one conductor part opposed to the other conductor part follows a normal distribution. M tolerance (±20%) is the general tolerance of the electrostatic capacitance of the electronic component. FIG. 7B is a view showing the relationship of the conductor parts in the cross section along the broken line in FIG. 6B. In order that the electrostatic capacitance is within the M tolerance in the graph shown in FIG. 7A, it is necessary that the overlapping length of the two conductor parts shown in FIG. 7B is about 80% or more of the length of the line segment.

In other words, the vertical axis of FIG. 7A indicates the ratio of the multilayer electronic component in which the opposing conductor parts show small misalignment (the overlapping length of about 80% or more).

The misalignment from the set forming position depends on the formation accuracy as described above. Therefore, if the formation accuracy is high, the distribution of the misalignment from the set forming position when a predetermined number of line segments is formed becomes small, and conversely, if the formation accuracy is low, the distribution of the deviation becomes large.

Here, assuming that the distribution of the misalignment of conductor parts satisfies the normal distribution, the standard deviation σ of the misalignment distribution can be three μm or less according to the process of the present embodiment, whereas the standard deviation σ of the misalignment distribution was found to be about 15 μm according to the conventional production processes such as screen printing.

The calculation result of the relationship between the length of the line segment to be formed and the ratio at which the electrostatic capacitance is within the M tolerance by using these standard deviations σ, is a graph shown in FIG. 7A. As is apparent from FIG. 7A, according to the process of the present embodiment, the ratio at which the electrostatic capacitance is within the M tolerance is almost 100% even when the length of the line segment is about 30 μm, whereas according to the conventional process, the ratio at which the electrostatic capacitance is within the M tolerance obviously falls below 100% when the length of the line segment is less than about 180 μm.

Since the ratio at which the electrostatic capacitance is within the M tolerance corresponds to the product yield, FIG. 7A shows the yield prediction of the line segment, that is, in the uniaxial direction. However, in the actual green multilayer body, the green conductor part is formed in a rectangular shape (biaxial direction), and furthermore, lamination misalignment occurs also in the laminating direction (height direction) by lamination. Therefore, regarding the multilayer electronic component, it is certain that the yield difference between the process according to the present embodiment and the conventional process will be larger than the difference shown in FIG. 7A.

(2.3.4. Step of Obtaining Element Body)

The obtained green multilayer body is treated to obtain the element body. Specifically, heat treatment is exemplified as the treatment. Examples of the heat treatment include binder removal treatment, firing treatment, annealing treatment, etc. After the completion of the heat treatment, the functional particles contained in the green functional part are integrated into the functional part, and the conductive particles contained in the green conductor part are integrated into the conductor part.

According to the present embodiment, since the green multilayer body is obtained as a green chip in which the shape and the size of the green chip correspond to those of the element body, the element body can be obtained by heat treatment without cutting the green multilayer body. Since the green chip shrinks during heat treatment to become the element body, the size of the green chip is larger than the size of the element body.

Meanwhile, before the heat treatment, the green multilayer body formed to have a larger size than the green chip may be subjected to a treatment in which the green multilayer body is cut and separated to obtain a plurality of green chips. In addition to the above-described treatment, known treatments may be performed on the green multilayer body.

In this step, by treating the green multilayer body, it is possible to obtain an element body having a structure in which the functional part and the conductor part are laminated. Terminal electrodes and the like can be formed on the obtained element body when necessary to obtain the multilayer electronic component.

3. Effect of the Present Embodiment

According to the present embodiment described in the above (1) and (2), by using the ejection device utilizing electrostatic attraction force, a plurality of line segments having a predetermined length is formed in parallel and are connected to each other to form the green functional part and the green conductor part.

The formation accuracy of line segments formed by the ejection device utilizing electrostatic attraction force is very high, and thus the rectangular region formed by connecting a plurality of these line segments can also be formed with high accuracy. In addition, since the length in the short direction of the rectangular region is twice or more the width of the line segments to be formed, the deviation in the thickness direction of the region formed by printing can be made extremely small.

Therefore, under a particular object of enhancing the formation accuracy of the multilayer body, the formation accuracy of the green functional part and the green conductor part can be enhanced in both the planar direction and the laminating direction. As a result, it is possible to obtain the multilayer electronic component in which the formation accuracy of the internal structure is enhanced. In particular, it is possible to suppress the deterioration of the formation accuracy of the multilayer electronic component due to the miniaturization of the multilayer electronic component. Thus, it is possible to dramatically improve the ratio (yield) of the product at which the electrostatic capacitance is within the M tolerance as compared with the conventional production process when the size of the conductor part to be formed becomes smaller, i.e. when the length in the short direction of the rectangular green conductor part becomes 180 μm or less.

Also, since the same voltage is simultaneously applied to the plurality of nozzles of the ejection device, the same shape can be formed as many as the number of nozzles at the same time. In the ejection device having such configuration, even if a plurality of nozzles is provided, there is only one voltage applying means for applying voltage to the nozzles and the same voltage is simultaneously applied to the plurality of nozzles. Thus, insulation is not necessary between the nozzles. Therefore, when the ejection device is used in the production process of the present embodiment, it is possible to change the disadvantage that the ejection device has to the advantage.

In addition, as the green multilayer body, by forming the green chip in which the shape and the size of the green chip correspond to those of the element body, it is possible to omit the steps of cutting and separating the green multilayer body to obtain the plurality of green chips. By doing so, it is possible to suppress variations in electrostatic capacitance or electric resistance due to cutting of the green multilayer body.

When emphasizing the line width of the drawn line segments and the uniformity of the thickness of the region formed by the green functional part and the green conductor part, it is possible to obtain the ink in which sedimentation of particles is effectively suppressed by setting the viscosity of the resin solution not containing the particles (the functional particles and the conductor particles) within the above-mentioned range. By suppressing sedimentation of particles contained in the ink, it is possible to stabilize the particle concentration and the viscosity of the ink and to improve the uniformity of the width of the line segment, thereby improving the thickness uniformity of the region of the functional part and the conductor part. Thus, the multilayer electronic component with high formation accuracy can be obtained.

4. Modification

In the above described embodiment, the multilayer ceramic capacitor is exemplified as the multilayer electronic component, but various multilayer electronic components are exemplified according to the materials constituting the functional layers. Specifically, a multilayer varistor, a multilayer thermistor, a multilayer piezoelectric element, a multilayer inductor, etc. are exemplified. In the case of the multilayer varistor or the multilayer thermistor, the functional layer is composed of a semiconductor ceramic layer. In the case of the multilayer piezoelectric element, the functional layer is composed of a piezoelectric ceramic layer. In the case of the multilayer inductor, the functional layer is composed of a ferrite layer or a soft magnetic metal layer. Further, materials of the conductor part are determined according to the materials of the functional part.

Also, in the above-described embodiment, the shapes and the materials of the respective green functional parts and the respective green conductor parts are the same. However, when forming the green multilayer body of the multilayer inductor, for example, the coil conductor may be formed by combining rectangular regions, and in each green conductor part, the coil conductors having different shapes can be overprinted, or the cross section of the coil conductors can be overprinted in a spiral manner to form a spiral conductor part. Alternatively, in the case of forming the green multilayer body of the multilayer composite electronic component, two or more kinds of materials may be used as the material of the functional particles constituting the green functional part and may be used as the material of the conductor particles constituting the green conductor part.

Although the present embodiment of the invention has been described above, the invention is not limited to the above embodiment and modifications may be made in various modes within the scope of the invention.

Examples

Next, the invention will be described in more detail based on the specific examples, however, the invention is not limited thereto.

(Experiment 1)

First, the first ink and the second ink were prepared. 5 parts by weight of butyral resin as the resin and butyl cellosolve as the solvent were mixed to prepare the resin solution, and barium titanate particles as functional particles were dispersed in the resin solution to prepare the first ink. The viscosity of the resin solution was 50 mPa·s. The average particle diameter of the barium titanate particles was 200 nm. A butyral resin as the resin and butyl cellosolve as the solvent were mixed to prepare the resin solution, and nickel particles as the conductive particles were dispersed in the resin solution to prepare the second ink. The viscosity of the resin solution was 46 mPa·s. The average particle diameter of the nickel particles was 100 nm.

By using the ejection device including a plurality of nozzles filled with the first ink and a plurality of nozzles filled with the second ink, the dielectric layers as the green functional part and the internal electrode layers as the green conductor part were alternately formed to form the green multilayer body having 75 internal electrode layers. The size of the dielectric layer was 220 µm in the short direction and 460 µm in the longitudinal direction. Further, the size of the internal electrode layer was 140 µm in the short direction.

The obtained green chip was subjected to binder removal treatment in an air atmosphere under the conditions of 250° C. for 10 h, and then fired in a reducing atmosphere at 1200° C. for 1 h to obtain the element body. Terminal electrodes were formed on the obtained element body, and a sample of the multilayer ceramic capacitor was obtained. The size of the element after sintering was approximately 0.4 mm×0.2 mm×0.2 mm.

As a result of measuring the electrostatic capacitance of the obtained sample and evaluating how much it fluctuates, 98% of the samples had capacitances of ±20% with respect to the target electrostatic capacitance. This value agrees well with FIG. 7A.

(Experiment 2)

Resin solutions having different viscosities were prepared by changing the blending amount of the butyral resin as the resin and the blending amount of butyl cellosolve as the solvent. The viscosities of the resin solutions are shown in Table 1. Further, ceramic particles having a density of 6 g/cm$^3$ and an average particle diameter of 300 nm were dispersed in these resin solutions to prepare inks. The viscosities of these inks are shown in Table 1.

Each prepared ink was filled in the nozzle of the ejection device used in Experiment 1, and ink was ejected to form a line segment of 10 mm. With respect to the formed line segment, the line width was measured every 1 mm, and the average line width and the standard deviation of the line width was calculated. Further, the CV value was calculated from the calculated standard deviation σ. The results are shown in Table 1.

TABLE 1

| Sample No. | Viscosity of resin solution [mPa·s] | Viscosity of Ink [mPa·s] | Line Width σ | Line Width CV value [%] | Line Width Average [μm] |
|---|---|---|---|---|---|
| 1 | 19.7 | 83.1 | 3.09 | 19.0 | 16.3 |
| 2 | 24.9 | 120 | 2.55 | 13.5 | 18.9 |
| 3 | 30.4 | 168 | 0.75 | 3.7 | 20.4 |
| 4 | 39.9 | 254 | 0.52 | 2.5 | 20.5 |
| 5 | 48.2 | 327 | 0.44 | 2.1 | 20.8 |
| 6 | 62.2 | 513 | 0.47 | 2.2 | 20.9 |
| 7 | 75.9 | 721 | 0.51 | 2.4 | 21.3 |
| 8 | 103 | 1144 | 0.94 | 4.3 | 21.8 |
| 9 | 143 | 1929 | 1.35 | 5.7 | 23.7 |

From Table 1, it was confirmed that as the viscosity of the resin solution increased, the line width tended to increase and the CV value tended to decrease. Therefore, it was confirmed that it is preferable to set the viscosity of the resin solution within the above-described range to suppress deviation in the line width (to secure the uniformity of the line width).

EXPLANATION OF REFERENCES

1 . . . Multilayer ceramic capacitor
10 . . . Element body
2 . . . Ceramic layer
3 . . . Internal electrode layer
4 . . . Terminal electrode
11 . . . Green multilayer body
12 . . . Green functional part
13 . . . Green conductor part
15 . . . Blank region
50 . . . Ejection device
51 . . . Nozzle
52 . . . Voltage applying means
53 . . . Support
54 . . . Table
60 . . . Ink

The invention claimed is:

1. A process for production of a multilayer electronic component having an element body with a functional part and a conductor part that are laminated,
using a single ejection device having nozzles wherein ink is electrically charged at the nozzles by applying a voltage and the electrically charged ink is ejected from the nozzles by an electrostatic attraction force, and comprising
a first step of forming a plurality of spaced green functional parts by using a first ink ejected from a first set of the nozzles and including a functional particle as the ink,
a second step of forming a plurality of spaced green conductor on the plurality of green functional parts by using a second ink ejected from a second set of the nozzles and including a conductive particle as the ink, with each of the plurality of green conductor parts overlaying one of the plurality of green functional parts,
a step of forming a plurality of green multilayer bodies by repeating the first step and the second step, and
a step of treating each of the plurality of green multilayer bodies to obtain the element body of the each of the plurality of multilayer electronic components, wherein:
the plurality of green multilayer bodies is simultaneously formed;
the same voltage is simultaneously applied to the first set of nozzles or the second set of nozzles connected in parallel;
the step of using a single ejection device includes applying the voltage to a support;
the plurality of spaced green functional parts and the plurality of green conductor parts are formed on the support; and
each of the plurality of green functional parts is formed by one nozzle of the first set of nozzles and the each of the plurality of green conductor parts is formed by one nozzle of the second set of nozzles.

2. The process for production of the multilayer electronic component according to claim 1, wherein
the each of the green multilayer bodies is a green chip in which a shape and a size of the green chip correspond to a shape and a size of the element body.

3. The process for production of the multilayer electronic component according to claim 1, wherein
the each of the plurality of green conductor parts is rectangular shaped and the width in a short direction is 180 μm or less.

4. The process for production of the multilayer electronic component according to claim 1, wherein
the ink comprises a solvent and a resin, and
a viscosity of a solution consisting of the solvent and the resin is 30 mPa·s or more.

5. The process for production of the multi-layer electronic component according to claim 1, wherein the nozzles and the support are configured and the voltage is selected such that the support is a source of the electrostatic attraction force that causes ejection of the ink.

6. The process for production of the multilayer electronic component according to claim 1, wherein:
a distance between the first and second sets of nozzles and an object to be drawn is 100 μm or less; and
the object to be drawn includes the support, one of the plurality of green functional parts or one of the plurality of green conductor parts.

* * * * *